United States Patent
Fuwa

(10) Patent No.: US 8,371,410 B2
(45) Date of Patent: Feb. 12, 2013

(54) INVERTED WHEEL TYPE MOVING BODY AND METHOD OF CONTROLLING THE SAME

(75) Inventor: Toshio Fuwa, Nisshin (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 637 days.

(21) Appl. No.: 12/597,004

(22) PCT Filed: Apr. 9, 2008

(86) PCT No.: PCT/JP2008/056967
§ 371 (c)(1),
(2), (4) Date: Oct. 22, 2009

(87) PCT Pub. No.: WO2008/133001
PCT Pub. Date: Nov. 6, 2008

(65) Prior Publication Data
US 2010/0174476 A1    Jul. 8, 2010

(30) Foreign Application Priority Data
Apr. 25, 2007 (JP) ................................ 2007-115150

(51) Int. Cl.
*B62D 61/02* (2006.01)

(52) U.S. Cl. ..................... 180/218; 180/7.1; 180/282

(58) Field of Classification Search .............. 180/41, 180/271, 282, 218, 71, 21
See application file for complete search history.

(56) References Cited

U.S. PATENT DOCUMENTS

| | | | |
|---|---|---|---|
| 5,791,425 A * | 8/1998 | Kamen et al. ............ | 180/7.1 |
| 5,975,225 A * | 11/1999 | Kamen et al. ............ | 180/7.1 |
| 6,003,624 A * | 12/1999 | Jorgensen et al. ......... | 180/6.5 |
| 6,062,600 A * | 5/2000 | Kamen et al. ............ | 280/755 |
| 6,223,104 B1 * | 4/2001 | Kamen et al. ............ | 701/1 |
| 6,508,319 B1 * | 1/2003 | Langenfeld et al. ........ | 180/65.1 |
| 6,547,026 B2 * | 4/2003 | Kamen et al. ............ | 180/282 |
| 6,571,892 B2 * | 6/2003 | Kamen et al. ............ | 180/8.2 |

(Continued)

FOREIGN PATENT DOCUMENTS

| | | |
|---|---|---|
| JP | 11-500331 | 1/1999 |
| JP | 11-48170 | 2/1999 |

(Continued)

OTHER PUBLICATIONS

Office Action from the Canadian Patent Office for Canadian Appl. No. 2,683,638 dated Oct. 6, 2011.

*Primary Examiner* — Joseph Rocca
*Assistant Examiner* — Nicole Verley
(74) *Attorney, Agent, or Firm* — Finnegan, Henderson, Farabow, Garrett & Dunner, LLP

(57) ABSTRACT

An inverted wheel type moving body according to the present invention includes a right chassis 17 and a left chassis 19 rotationally supporting wheels, motors 34 and 36 rotationally driving a right driving wheel 18 and a left driving wheel 20, a body 12 rotatably supported on the right chassis 17 and the left chassis 19 through a right arm 14 and a left arm 16, lower joint motors 65 and 95 disposed in the right arm 14 and the left arm 16 and varying vehicle height of the moving body 100, and a control unit 80 that controls the lower joint motors 65 and 95 to lower the vehicle height based on a fail signal 88 output when the inverted wheel type moving body is in an abnormal state.

12 Claims, 7 Drawing Sheets

U.S. PATENT DOCUMENTS

| | | | |
|---|---|---|---|
| 6,915,878 B2 * | 7/2005 | Kamen et al. | 182/141 |
| 7,178,614 B2 * | 2/2007 | Ishii | 180/7.1 |
| 7,363,993 B2 * | 4/2008 | Ishii | 180/7.1 |
| 7,677,345 B2 * | 3/2010 | Hosoda | 180/218 |
| 7,703,568 B2 * | 4/2010 | Ishii | 180/218 |
| 7,823,676 B2 * | 11/2010 | Yamada et al. | 180/218 |
| 8,011,459 B2 * | 9/2011 | Serai et al. | 180/8.2 |
| 8,016,060 B2 * | 9/2011 | Miki et al. | 180/65.1 |
| 8,151,912 B2 * | 4/2012 | Koide et al. | 180/7.1 |
| 8,160,794 B2 * | 4/2012 | Fuwa | 701/70 |
| 8,170,781 B2 * | 5/2012 | Fuwa | 701/124 |
| 2002/0121394 A1 * | 9/2002 | Kamen et al. | 180/41 |
| 2003/0184071 A1 * | 10/2003 | Tokumaru et al. | 280/758 |
| 2010/0193265 A1 * | 8/2010 | Furuta et al. | 180/21 |

FOREIGN PATENT DOCUMENTS

| | | |
|---|---|---|
| JP | 2000-514680 | 11/2000 |
| JP | 2006-247802 | 9/2006 |

* cited by examiner

INVERTED WHEEL TYPE MOVING BODY AND METHOD OF CONTROLLING THE SAME

CROSS-REFERENCE TO RELATED APPLICATIONS

This application is a national phase application of International Application No. PCT/JP2008/056967, filed Apr. 9, 2008, and claims the priority of Japanese Application No. 2007-115150, filed Apr. 25, 2007, the contents of both of which are incorporated herein by reference.

TECHNICAL FIELD

The present invention relates to an inverted wheel type moving body and a method of controlling the same.

BACKGROUND ART

An inverted wheel type moving body is typically controlled to travel in such a manner that the position of the center of mass of the body is constantly corrected to maintain the stable state by driving right and left driving wheels. In such a moving body, sudden stop or sudden acceleration may cause overturning of the moving body. A moving body equipped with sub wheels in order to prevent such an overturning during the travelling is disclosed (patent documents 1 and 2).

For example, according to a vehicle in the patent document 1, sub wheels are arranged in a front-back direction of drive wheels. The sub wheels are provided in end parts of struts extended and retracted by actuators. Upon detection of the overturning by a detector that detects a moment, the strut is deployed by the actuator to bring the sub wheel contact with the ground.

[Patent Document 1] Japanese Patent Translation Publication No. 2000-514680
[Patent Document 2] Japanese Unexamined Patent Application Publication No. 2006-247802

DISCLOSURE OF THE INVENTION

Problems to be Solved by the Invention

However, if abrupt braking force is applied to the moving body above, the body runs on the sub wheel. Then, the body may be rotated or overturned. The related arts have a problem that the impact may be applied due to the overturning.

The present invention has been made in order to solve such a problem, and aims to provide an inverted wheel type moving body which is capable of reducing impact due to overturning and a method of controlling the same.

Means for Solving the Problems

An inverted wheel type moving body according to a first aspect of the present invention is an inverted wheel type moving body that includes a plurality of devices and moves by inverted pendulum control, the inverted wheel type moving body including: a chassis rotatably supporting a wheel, a first drive unit rotationally driving the wheel, a body rotatably supported on the chassis through a support member, a second drive unit disposed in the support member and varying vehicle height of the inverted wheel type moving body, and a control unit that controls the second drive unit to lower the vehicle height based on a fail signal output from the device when the inverted wheel type moving body is in an abnormal state. According to such a configuration, the vehicle height lowers when the state is in an abnormal state. Accordingly, a moment is reduced and the impact due to overturning can be reduced.

The inverted wheel type moving body according to a second aspect of the present invention is the above-described moving body, including an impact absorbing member that projects anteriorly to the body in a travelling direction side according to the fail signal. According to such a configuration, the impact can be absorbed by the impact absorbing member, which enables to further reduce the impact.

The inverted wheel type moving body according to a third aspect of the present invention is the above-described moving body, in which the impact absorbing member provided in a rotary joint is projected by the second drive unit driving the rotary joint provided in the support member. Accordingly, the impact can be reduced with the simple configuration.

The inverted wheel type moving body according to a fourth aspect of the present invention is the above-described moving body, including an impact absorbing member that projects posteriorly to the body in an opposite side of the travelling direction side according to the fail signal. Accordingly, the impact when the moving body overturns in the opposite side of the travelling direction can be reduced.

The inverted wheel type moving body according to a fifth aspect of the present invention is the above-described moving body, in which a plurality of support members are provided, the impact absorbing member that projects in the travelling direction side is provided in a rotary joint arranged in a first support member of the plurality of support members, the impact absorbing member that projects in the opposite side of the travelling direction side is provided in a rotary joint arranged in a second support member of the plurality of support members, and the rotary joints of the first and the second support members are driven by the second drive unit. Accordingly, the impact can be reduced with the simple configuration.

The inverted wheel type moving body according to a sixth aspect of the present invention is the above-described moving body, in which the impact absorbing member is projected above a rotation axis of the wheel. Accordingly, overturning due to running-on can be prevented.

A method of controlling an inverted wheel type moving body according to a seventh aspect of the present invention is a method controlling an inverted wheel type moving body, the inverted wheel type moving body including a chassis rotatably supporting a wheel, a first drive unit rotationally driving the wheel, a body rotatably supported on the chassis through a support member, and a second drive unit disposed in the support member and varying vehicle height of the inverted wheel type moving body, the inverted wheel type moving body moving by operation of a plurality of devices, the method including a step of outputting a fail signal from the device when the inverted wheel type moving body is in an abnormal state, and a step of controlling the second drive unit to lower the vehicle height according to the fail signal. According to the method, the vehicle height is made lower when the state is in the abnormal state. Accordingly, the moment is reduced and the impact due to the overturning can be reduced.

The method of controlling the inverted wheel type moving body according to an eighth aspect of the present invention is the above-described method, further including a step of projecting an impact absorbing member anteriorly to the body in a travelling direction side according to the fail signal. According to such a configuration, the impact can be absorbed by the impact absorbing member, and the impact can further be reduced.

The method of controlling the inverted wheel type moving body according to a ninth aspect of the present invention is the above-described method, in which the impact absorbing member provided in a rotary joint is projected by the second drive unit driving the rotary joint provided in the support member. Accordingly, the impact can be reduced with the simple configuration.

The method of controlling the inverted wheel type moving body according to a tenth aspect of the present invention is the above-described method, in which the impact absorbing member projects in the travelling direction and in an opposite side of the travelling direction in the step of projecting the impact absorbing member. Accordingly, the impact when the moving body overturns in a direction opposite to the travelling direction can be reduced.

The method of controlling the inverted wheel type moving body according to an eleventh aspect of the present invention is the above-described method, in which a plurality of support members are provided, the impact absorbing member that projects in the travelling direction side is provided in a rotary joint arranged in a first support member of the plurality of support members, the impact absorbing member that projects in the opposite side of the travelling direction side is provided in a rotary joint arranged in a second support member of the plurality of support members, and the rotary joints of the first and the second support members are driven by the second drive unit. Accordingly, the impact can be reduced with the simple configuration.

The method of controlling the inverted wheel type moving body according to a twelfth aspect of the present invention is the above-described method, in which the impact absorbing member is projected above a rotation axis of the wheel. Accordingly, overturning due to running-on can be prevented.

ADVANTAGEOUS EFFECTS OF THE INVENTION

According to the present invention, it is an object to provide an inverted wheel type moving body which enables to reduce the impact due to the overturning and a method of controlling the same.

DESCRIPTION OF REFERENCE NUMERALS

12 BODY
14 RIGHT ARM
16 LEFT ARM
17 RIGHT CHASSIS
18 RIGHT DRIVING WHEEL
19 LEFT CHASSIS
20 LEFT DRIVING WHEEL
22 PASSENGER SEAT
26 RIGHT MOUNT
28 LEFT MOUNT
30 AXLE
32 AXLE
34 RIGHT WHEEL DRIVE MOTOR
36 LEFT WHEEL DRIVE MOTOR
48 GYRO-SENSOR
52 RIGHT WHEEL ENCODER
54 LEFT WHEEL ENCODER
61 UPPER JOINT
62 UPPER LINK
63 LOWER JOINT
64 LOWER LINK
65 LOWER JOINT MOTOR
66 UPPER JOINT MOTOR
67 IMPACT ABSORBING MEMBER
70 PEDESTAL
72 COLUMN
80 CONTROL UNIT
81 TRAVEL CONTROL MODULE
82 POSTURE CONTROL MODULE
91 UPPER JOINT
92 UPPER LINK
93 LOWER JOINT
94 LOWER LINK
95 LOWER JOINT MOTOR
96 UPPER JOINT MOTOR
97 IMPACT ABSORBING MEMBER
100 MOVING BODY
101 MOVING BODY

BEST MODES FOR CARRYING OUT THE INVENTION

A moving body according to the present embodiment is an inverted wheel type moving body that travels by the inverted pendulum control. The moving body travels to the desired place by driving wheels that contact with the ground. In addition, the moving body can be maintained at an inverted state by driving the wheels in response to an output from a gyro-sensor or the like.

Figure 1:
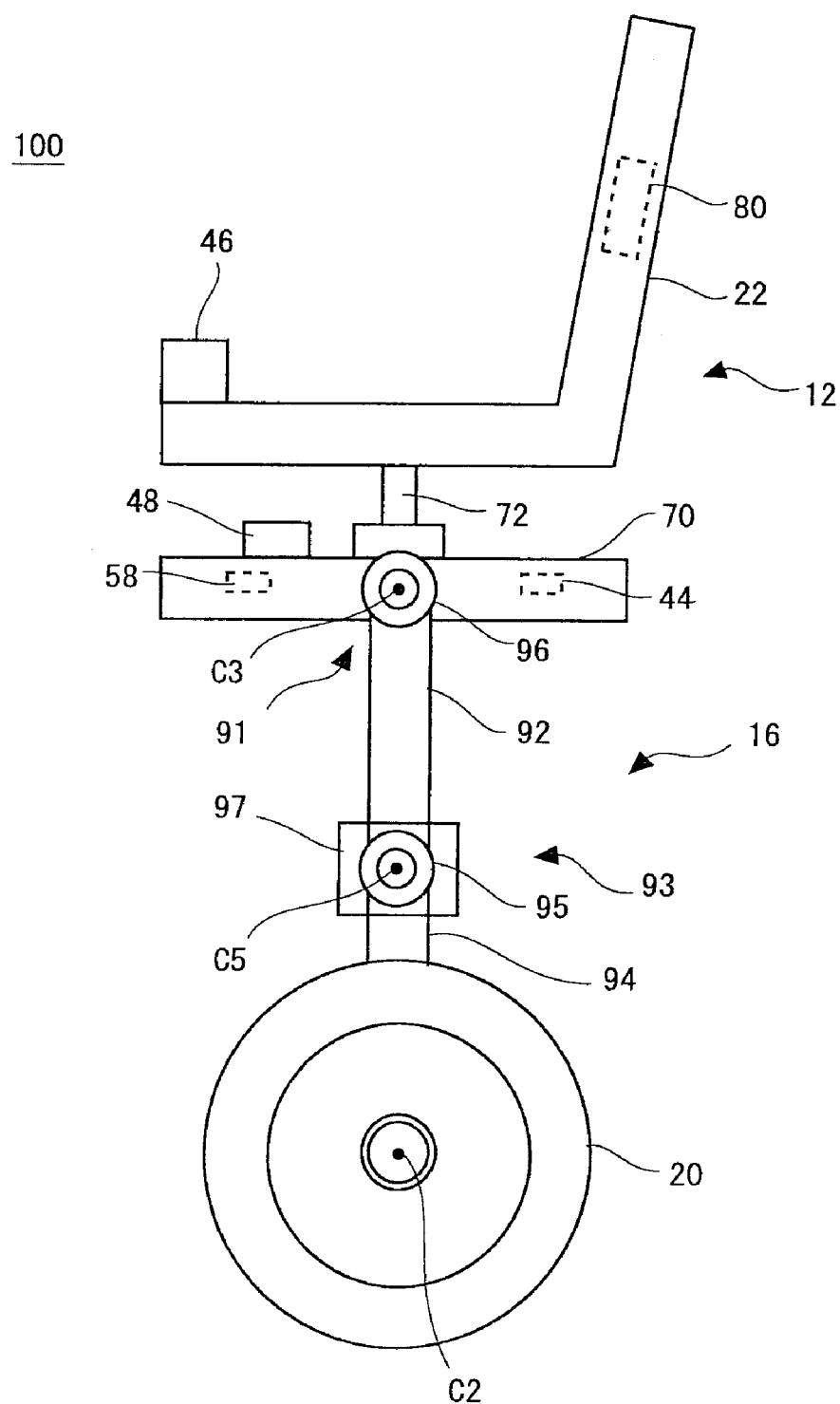
FIG. 1 A side view showing the structure of a moving body according to an embodiment of the present invention.
Figure 2:
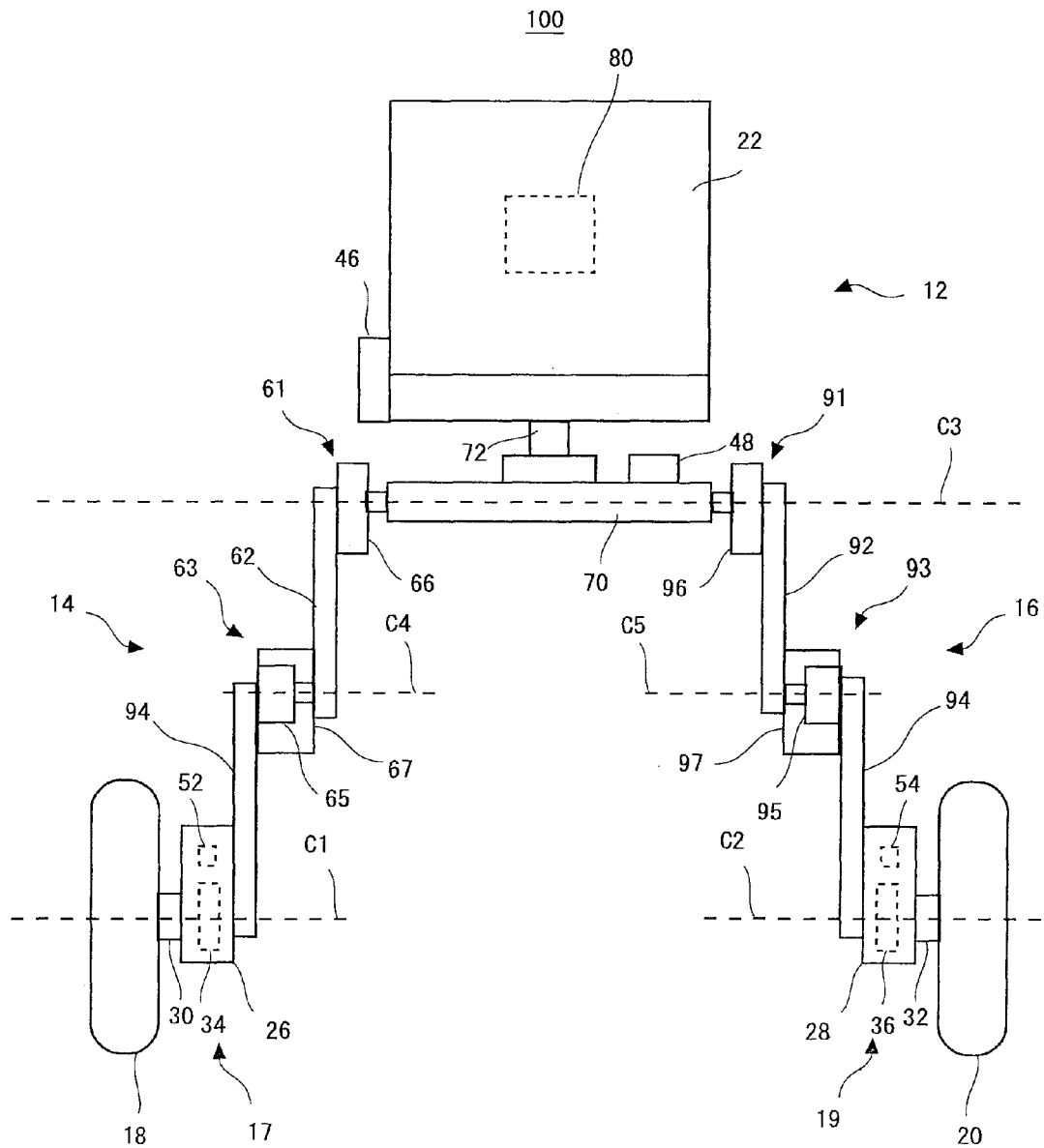
FIG. 2 A front view showing the structure of the moving body according to the embodiment of the present invention.

Referring to FIGS. 1 and 2, the structure of a moving body 100 according to the present embodiment will be described. FIG. 1 is a side view schematically showing the structure of the moving body 100, and FIG. 2 is a front view schematically showing the structure of the moving body 100.

As shown in FIG. 2, the moving body 100 is an inverted wheel type moving body (travelling body), and includes a right driving wheel 18, a left driving wheel 20, a right chassis 17, a left chassis 19, a right arm 14, a left arm 16, and a body 12. The body 12 is an upper body unit of the moving body 100 disposed above the right driving wheel 18 and the left driving wheel 20. Here, the travelling direction of the moving body 100 (direction perpendicular to the paper in which FIG. 2 is drawn) is referred to as front-back direction, and a direction perpendicular to the front-back direction in the horizontal plane is referred to as lateral direction (transverse direction). Thus, FIG. 2 is a diagram of the moving body 100 when seen from the front side in the travelling direction, and FIG. 1 is a diagram of the moving body 100 when seen from the left side.

The right arm 14 and the left arm 16 are swing arms including joints. When the moving body 100 travels normally, the right arm 14 and the left arm 16 are extended, as shown in FIG. 1. Further, the right arm 14 and the left arm 16 are driven in accordance with the inclination angle of the body 12. Specifically, when the body 12 is inclined in the lateral direction in accordance with the inclination angle of the ground, one of the arms 14, 16 is driven to make the body 12 parallel. For example, assume a situation in which only the right driving wheel 18 runs on a step while the moving body 100 is travelling on the level ground, or a situation in which the moving body 100 is travelling from the level ground to the inclined ground where the right side is higher than the left side. In this case, the height with respect to the horizontal direction varies between the right driving wheel 18 and the left driving wheel 20. In summary, the right driving wheel 18 becomes higher than the left driving wheel 20. In this case, the right arm 14 is shortened to adjust the inclination angle of the body 12. For example, the joint of the right arm 14 is driven to bend the right arm 14 into a dog leg shape. Thus, the right arm 14 becomes shorter, and the body 12 can be made parallel in the transverse direction (lateral direction). Note that the structure of the right arm 14 and the left arm 16 will be described later.

On the side surface side of the right chassis 17, the right driving wheel 18 that contacts with the ground is provided. On the side surface side of the left chassis 19, the left driving wheel 20 that contacts with the ground is provided. The right driving wheel 18 and the left driving wheel 20 are a pair of wheels that rotate on the same axis. The moving body 100 moves by the rotation of the right driving wheel 18 and the left driving wheel 20 that contact with the ground.

Between the right driving wheel 18 and the right arm 14, the right chassis 17 is disposed. The right chassis 17 includes a right mount 26. Between the right arm 14 and the right driving wheel 18, the right mount 26 is disposed. The right mount 26 is fixed to the side end of the right arm 14. The right chassis 17 rotationally supports the right driving wheel 18 through an axle 30. The right driving wheel 18 is fixed to a rotation axis C1 of a right wheel drive motor 34 through the axle 30. The right wheel drive motor 34 is fixed into the right mount 26, and functions as a drive unit (actuator) for the wheel. In short, the right wheel drive motor 34 rotationally drives the right driving wheel 18.

Between the left driving wheel 20 and the left arm 16, the left chassis 19 is disposed. The left chassis 19 includes a left mount 28. Between the left arm 16 and the left driving wheel 20, the left mount 28 is disposed. The left mount 28 is fixed to the side end of the left arm 16. The left mount 28 rotationally supports the left driving wheel 20 through an axle 32. The left driving wheel 20 is fixed to a rotation axis C2 of a left wheel drive motor 36 through the axle 32. The left wheel drive motor 36 is fixed into the left mount 28, and functions as a drive unit (actuator) for the wheel. In short, the left wheel drive motor 36 rotationally drives the left driving wheel 20. Between the right driving wheel 18 and the left driving wheel 20, the right chassis 17 and the left chassis 19 are disposed. The right chassis 17 may be fixed to the left chassis 19 in order to dispose the right driving wheel 18 and the left driving wheel 20 on the same axis.

The right wheel drive motor 34 and the left wheel drive motor 36 are, for example, servomotors. The actuators for the wheels are not limited to electrical motors, and actuators using air pressure or oil pressure may also be used.

The right mount 26 further includes a right wheel encoder 52. The right wheel encoder 52 detects the rotation angle of the right driving wheel 18 as the rotation amount of the right driving wheel 18. The left mount 28 includes a left wheel encoder 54. The left wheel encoder 54 detects the rotation angle of the left driving wheel 20 as the rotation amount of the left driving wheel 20.

The left arm 16 is mounted to the side end of the left driving wheel 20 through the left mount 28. The left arm 16 includes an upper joint 91, an upper link 92, a lower joint 93, and a lower link 94. The upper link 92 and the lower link 94 are rod-shaped members. The upper link 92 and the lower link 94 are rigid bodies having substantially the same length. The upper joint 91 and the lower joint 93 are rotary joints.

The lower link 94 is connected to the left mount 28. In short, the left mount 28 is mounted to the lower end of the lower link 94. The left mount 28 rotatably supports the lower link 94. Further, the lower joint 93 is disposed to the lower link 94. The lower link 94 is connected to the upper link 92 through the lower joint 93. In summary, the lower joint 93 disposed to the upper end of the lower link 94 is disposed to the lower end of the upper link 92.

The lower joint 93 includes a lower joint motor 95. When the lower joint motor 95 is driven, the upper link 92 rotates. When the lower joint motor 95 is driven, the angle of the upper link 92 with respect to the lower link 94 varies. As will be shown, the lower joint 93 is disposed in the middle of the left arm 16. In summary, the lower joint 93 is disposed between the upper link 92 and the lower link 94. The upper link 92 is fixed to a rotation axis C5 of the lower joint motor 95.

The upper joint 91 is provided in the upper end of the upper link 92. The upper joint 91 connects the upper link 92 and the body 12. The left arm 16 is connected to the body 12 through the upper joint 91. As stated, the upper joint 91 is provided in the upper end of the left arm 16. Further, the upper joint 91 includes an upper joint motor 96. The body 12 is mounted to the left arm 16 through the upper joint motor 96. When the upper joint motor 96 is driven, the body 12 rotates. In summary, when the upper joint motor 96 is driven, the angle of the body 12 with respect to the upper link 92 varies. The body 12 is fixed to a rotation axis C3 of the upper joint motor 96.

When the upper joint 91 and the lower joint 93 are driven, the posture of the body 12 varies. In summary, the left arm 16 is a link mechanism that connects the body 12 with the left driving wheel 20. Thus, the lower end side of the left arm 16 is connected to the rotation axis C2 of the left driving wheel 20, and the upper end side thereof is connected to the rotation axis C3 of the body 12. The left arm 16 functions as an arm mechanism of two degree of freedom including two rotary joints. In summary, the left arm 16 functions as an arm mechanism including a plurality of joints, and connects the body 12 with the right chassis 19.

The longitudinal direction of the left arm 16 is perpendicular to the rotation axis C2. Thus, the longitudinal direction of the lower link 94 and the rotation axis C2 are orthogonal to each other. When the moving body 100 travels normally, the upper link 92 and the lower link 94 are provided along with the vertical direction. Thus, the rotation angle of the lower joint motor 95 is fixed so that the upper link 92 and the lower link 94 become parallel to each other. The body 12 is rotationally supported with respect to the rotation axis C2 through the left arm 16. The rotation axis C2 and the rotation axis C5 are disposed in parallel with a distance corresponding to the length of the lower link 94. The rotation axis C3 and the rotation axis C5 are disposed in parallel with a distance corresponding to the length of the upper link 92. When the moving body 100 travels normally, the rotation axis C3 is parallel with the rotation axis C5.

Further, in the lower joint 93, an impact absorbing member 97 is provided. The impact absorbing member 97 is arranged so as to surround the lower joint motor 95. The impact absorbing member 97 is formed of an elastic body such as a gum, for example. This impact absorbing member 97 absorbs the impact upon occurrence of overturning. In summary, upon occurrence of overturning, the impact absorbing member 97 firstly hits against the ground. Accordingly, the impact to the passenger due to the overturning is absorbed.

The right arm 14 is mounted to the side end of the right driving wheel 18 through the right mount 26. The right arm 14 includes an upper joint 61, an upper link 62, a lower joint 63, and a lower link 64. The upper link 62 is connected to the body 12 through the upper joint 61. Further, the lower link 64 is connected to the right chassis 17. Further, the lower link 64 and the upper link 62 are connected through the lower joint 63. The lower joint 63 includes a lower joint motor 65. The upper joint 61 includes an upper joint motor 66. An impact absorbing member 67 is provided in the lower joint 63. As stated above, the right arm 14 also functions as an arm mechanism of two degree of freedom including two joints, as is the same as the left arm 16. As the structure of the right arm 14 is the same as that of the left arm 16, the description will be omitted. Note that the rotation axis of the lower joint motor 65 of the right arm 14 is a rotation axis C4. Further, the upper joint motor 66 rotates about the rotation axis C3.

When the upper joint 61 and the lower joint 63 of the right arm 14 are driven, the posture of the body 12 varies. In summary, the right arm 14 is a link mechanism that connects the body 12 with the right driving wheel 18. Thus, the lower end side of the right arm 14 is connected to the rotation axis C1 of the right driving wheel 18, and the upper end side thereof is connected to the rotation axis C3 of the body 12. The right arm 14 functions as an arm mechanism of two degree of freedom including two rotary joints. In summary, the right arm 14 functions as an arm mechanism including a plurality of joints, and connects the body 12 with the right chassis 17.

The longitudinal direction of the right arm 14 is perpendicular to the rotation axis C1. Thus, the longitudinal direction of the lower link 64 and the rotation axis C1 are orthogonal to each other. When the moving body 100 travels normally, the upper link 62 and the lower link 64 are arranged on the same axis. In summary, the rotation angle of the lower joint motor 65 is fixed so that the upper link 62 and the lower link 64 are collinearly arranged when seen from the side surface. The body 12 is rotationally supported with respect to the rotation axis C1 through the right arm 14. Further, when the moving body 100 travels normally, the rotation axis C1, the rotation axis C3, and the rotation axis C4 are parallel with one another.

Now, the upper joint motor 66 of the right arm 14 and the upper joint motor 96 of the left arm 16 are arranged along with the vertical direction. In summary, the upper joint motor 66 of the right arm 14 and the upper joint motor 96 of the left arm 16 include a common rotation axis C3. Further, when the moving body 100 travels normally, the lower joint motor 65 of the right arm 14 and the lower joint motor 95 of the left arm 16 are arranged on the same axis. In summary, the rotation axis C4 of the upper joint motor 66 has the same height as that of the rotation axis C5 of the upper joint motor 96.

As stated above, the upper joint motor 66 and the lower joint motor 65 are mounted to the right arm 14, and the upper joint motor 96 and the lower joint motor 95 are mounted to the left arm 16. The upper joint motors 66 and 96 vary the angle of the body 12 with respect to the upper links 62 and 92. The lower joint motor 65 varies the angle of the upper link 62 with respect to the lower link 64, and the lower joint motor 95 varies the angle of the upper link 92 with respect to the lower link 94. In summary, the upper joint motor 66 and the lower joint motor 65 are drive units (actuators) controlling the angle of the joint of the right arm 14. The upper joint motor 96 and the lower joint motor 95 are drive units (actuators) controlling the angle of the joint of the left arm 16. Thus, the position of the body 12 with respect to the right chassis 17 and the left chassis 19 can be varied by driving the right arm 14 and the left arm 16. The upper joint motors 66 and 96 and the lower joint motors 65 and 95 are, for example, servomotors that control the posture angle of the body 12. Note that the kinetic power of the motors may be transmitted through gears, belts, pulleys, and the like. The height of the body 12 is varied by driving each of the motors. Thus, the vehicle height of the moving body 100 can be varied.

When the upper joint motor 66 and the upper joint motor 96 are driven, the angle of the pedestal 70 with respect to the right arm 14 and the left arm 16 varies. Thus, the pedestal 70 can be rotated back and forth with the rotation axis C3 being as a rotation center. The rotation axis C3 is parallel to the rotation axes C1 and C2 and positioned above the rotation axes C1 and C2. The right arm 14 is provided between the rotation axis C3 and the rotation axis C1. The left arm 16 is provided between the rotation axis C3 and the rotation axis C2. The lower joint motor 65 rotates the upper link 62 about the rotation axis C4 with respect to the lower link 64. The lower joint motor 95 rotates the upper link 92 about the rotation axis C5 with respect to the lower link 94. Further, the rotation axis C4 is positioned between the rotation axis C3 and the rotation axis C1, and the rotation axis C5 is positioned between the rotation axis C3 and the rotation axis C2. The upper joint motor 66 and the upper joint motor 96 are provided in the rotation axis C3, and serve as swing arms controlling the posture by the right arm 14 and the left arm 16. Note that, when the moving body 100 travels normally, the rotation axis C1 to the rotation axis C5 are parallel, which means that the axes are parallel with the lateral direction of the moving body 100.

The body 12 includes a pedestal 70, a column 72, a gyro-sensor 48, and a passenger seat 22. The flat-plate like pedestal 70 is mounted to the right arm 14 and the left arm 16 through the upper joint motor 66 and the upper joint motor 96, respectively. The right arm 14 and the left arm 16 are provided at the opposing side surfaces of the pedestal 70. In short, the pedestal 70 is disposed between the right arm 14 and the left arm 16.

The pedestal 70 contains a battery module 44 and a sensor 58. The sensor 58 is, for example, an optical obstacle detection sensor that outputs a detection signal upon detection of an obstacle in front of the moving body 100. The sensor 58 may include other sensors in place of the obstacle sensor. For example, the sensor 58 may be an acceleration sensor. As a matter of course, two or more sensors may be used as the sensor 58. The sensor 58 detects variations that vary in accordance with the state of the moving body 100. The battery module 44 supplies electrical power to the sensor 58, the gyro-sensor 48, the right wheel drive motor 34, the left wheel drive motor 36, the upper joint motor 66, the upper joint motor 96, the lower joint motor 65, the lower joint motor 95, a control unit 80, and the like.

The gyro-sensor 48 is provided on the pedestal 70 of the body 12. The gyro-sensor 48 detects an angular velocity with respect to the inclination angle of the body 12. In this case, the term "inclination angle of the body 12" means the degree of the inclination of the position of the center of mass of the moving body 100 with respect to the vertical axis extending upwardly from the axles 30 and 32. For example, the inclination angle of the body 12 is defined to be "positive" when the body 12 is inclined forward in the travelling direction of the moving body 100, and defined to be "negative" when the body 12 is inclined backward in the travelling direction of the moving body 100.

Further, in addition to the front-back direction in the travelling direction, an inclination angle velocity in the lateral direction is also measured by using the three-axis (roll, pitch, and yaw) gyro-sensor 48. In this manner, the gyro-sensor 48 measures variations in the inclination angles of the pedestal 70 as the inclination angle velocities of the body 12. As a matter of course, the gyro-sensor 48 may be mounted in other places. The inclination angle velocities measured by the gyro-sensor 48 vary in accordance with variations in the posture of the moving body 100. That is, the inclination angle velocities are variations that vary in accordance with the position of the center of mass of the body 12 with respect to the positions of the axles. Accordingly, when the inclination angles of the body 12 vary abruptly by a disturbance or the like, the inclination angle velocity values become larger.

The column 72 is provided near the center of the pedestal 70. The column 72 supports the passenger seat 22. That is, the passenger seat 22 is fixed to the pedestal 70 through the column 72. The passenger seat 22 has a chair-like shape on which the passenger can be seated.

A manipulation module 46 is provided on the side surface of the passenger seat 22. A manipulation lever (not shown) and a brake lever (not shown) are provided on the manipulation module 46. The manipulation lever is a manipulation member that is used by the passenger to adjust the travelling velocity and the travelling direction of the moving body 100. The passenger can adjust the travelling velocity of the moving body 100 by adjusting the manipulation amount of the manipulation lever. Further, the passenger can specify the travelling direction of the moving body 100 by adjusting the manipulation direction of the manipulation lever. The moving body 100 can perform forward movements, stops, backward movements, left turns, right turns, left rotations, and right rotations in accordance with manipulations applied to the manipulation lever. The passenger can put a brake on the moving body 100 by tilting the brake lever. The moving body 100 travels in the direction perpendicular to the axles 30 and 32.

Furthermore, the control unit 80 is mounted on the backrest unit of the passenger seat 22. The control unit 80 controls the travelling (movement) of the moving body 100 by controlling the right wheel drive motor 34 and the left wheel drive motor 36 in accordance with the manipulations carried out on the manipulation module 46 by the passenger. The seating surface of the passenger seat 22 is disposed in parallel to the upper surface of the pedestal 70. The control unit 80 controls the right wheel drive motor 34 and the left wheel drive motor 36 in accordance with the manipulations carried out on the manipulation module. In this manner, the right wheel drive motor 34 and the left wheel drive motor 36 are driven at a torque command value in accordance with the manipulations on the manipulation module 46.

The control unit 80 includes a CPU (Central Processing Unit), a ROM (Read Only Memory), a RAM (Random Access Memory), a communication interface, and the like, and controls various operations of the moving body 100. Further, the control unit 80 carries out various control in accordance with a control program stored, for example, in the ROM. The control unit 80 controls the right wheel drive motor 34 and the left wheel drive motor 36 independently from each other by using well-known feedback control at the predetermined angle. The right wheel drive motor 34 and the left wheel drive motor 36 rotate in accordance with the manipulations in the manipulation module 46. For example, the manipulation module 46 is equipped with the sensor measuring the tilt angle of the manipulation lever. The manipulation module 46 calculates the accelerations and the target velocity by the tilt angle of the manipulation lever and the variations of the tilt angle. More specifically, the accelerations and the target velocity increase as the tilt angle of the manipulation lever increases. Then, the right wheel drive motor 34 and the left wheel drive motor 36 are controlled so as to be able to achieve desired accelerations and target velocity.

Furthermore, the control unit 80 controls the angle of each joint of the right arm 14 and the left arm 16. Each joint is independently driven. The posture of the moving body 100 varies by driving the right arm 14 and the left arm 16. In short, the control unit 80 controls the height of the moving body 100 and the inclination angle of the lateral direction.

For example, when the right arm 14 or the left arm 16 is driven, the pedestal 70 can be inclined in the lateral direction. In short, it is possible to autonomously swing and incline the body 12 of the moving body 100 in a roll direction (about the longitudinal axis of the moving body 100 parallel with a forward propelling direction). For example, the upper joint motor 66 and the lower joint motor 65 of the right arm 14 are driven to bend the right arm 14 into the dog leg shape. Specifically, the upper joint motor 66 and the lower joint motor 65 are rotated in an opposite direction with each other by a certain angle. Thus, the rotation axis C3 and the rotation axis C1 are close to each other. The vehicle height of the right side of the moving body 100 becomes lower. As such, by independently driving the right arm 14 and the left arm 16, the ride quality for the passenger can be improved. To be more specific, the body 12 can be made parallel in the lateral direction even with the inclination or the step on the ground. In short, it is possible to prevent the body 12 from being inclined in the lateral direction and to improve the ride quality.

For example, the right arm 14 and the left arm 16 are extended during a time at which the moving body 100 travels on the level ground. In other words, the distance from the rotation axis C1 to the rotation axis C3 and the distance from the rotation axis C2 to the rotation axis C3 are made equal to each other. Accordingly, the rotation axis C3 becomes horizontal, and the body 12 becomes horizontal in the lateral direction. When the right driving wheel 18 runs on a step while the moving body 100 is travelling on the level ground, or when the moving body 100 is travelling from the level ground to the inclined ground, the right driving wheel 18 becomes higher than the left driving wheel 20. Then, the rotation axis C3 inclines in the right upward direction and the body 12 is inclined in the lateral direction. In order to prevent the body 12 from being inclined in the lateral direction, the right arm 14 is driven as stated above. Then, the right arm 14 is bent into the dog leg shape and the rotation axis C1 and the rotation axis C3 are close to each other. On the other hand, as the left arm 16 is extended, the rotation axis C2 is away from the rotation axis C3. As such, the inclination of the rotation axis C3 varies, and the body 12 can be made horizontal.

More specifically, it is detected by the output from the gyro-sensor 48 that the body 12 is inclined in the lateral direction. The control unit 80 drives one of the arms 14, 16 according to the output from the gyro-sensor 48. In other words, the control unit 80 drives the arm which is made higher by the inclination. For example, when the right side of the body 12 is higher, the control unit 80 controls each joint of the right arm 14. Then, the lower joint motor 65 and the upper joint motor 66 are driven to bend the right arm 14. Further, the right arm 14 is bent by the length corresponding to the inclination angle of the body 12. In other words, the upper joint 61 and the lower joint 63 are driven by the rotation angle corresponding to the inclination angle of the body 12 in the lateral direction. Thus, the rotation axis C3 is made horizontal and the body 12 is made horizontal in the lateral direction. As a matter of course, when the left side of the body 12 is higher, the left arm 16 is driven in the same way. As such, the right arm 14 and the left arm 16 serve as swing arms that correct the inclination of the body 12 in the horizontal direction.

Figure 3A:
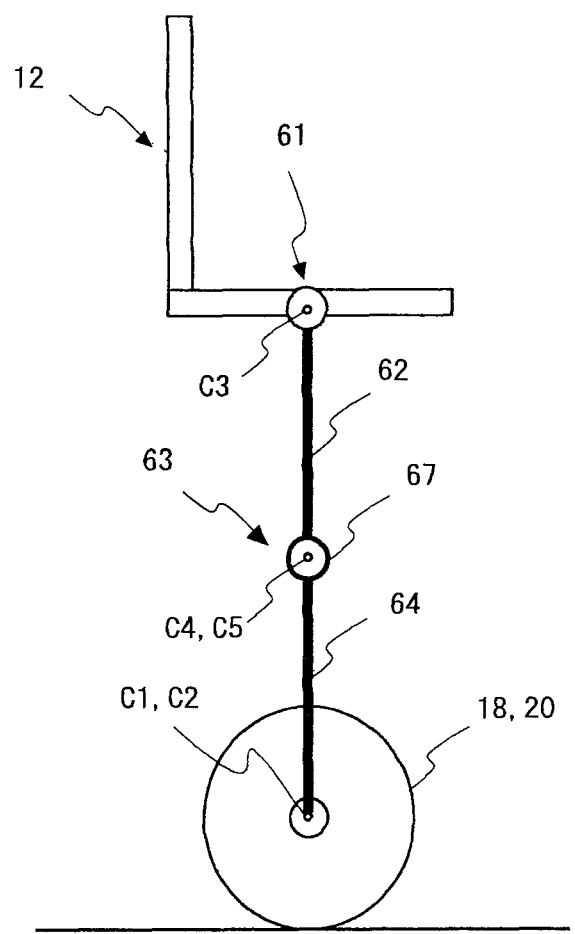
FIG. 3A A side view for describing the operation of the moving body when a fail occurs according to the embodiment of the present invention.
Figure 3B:
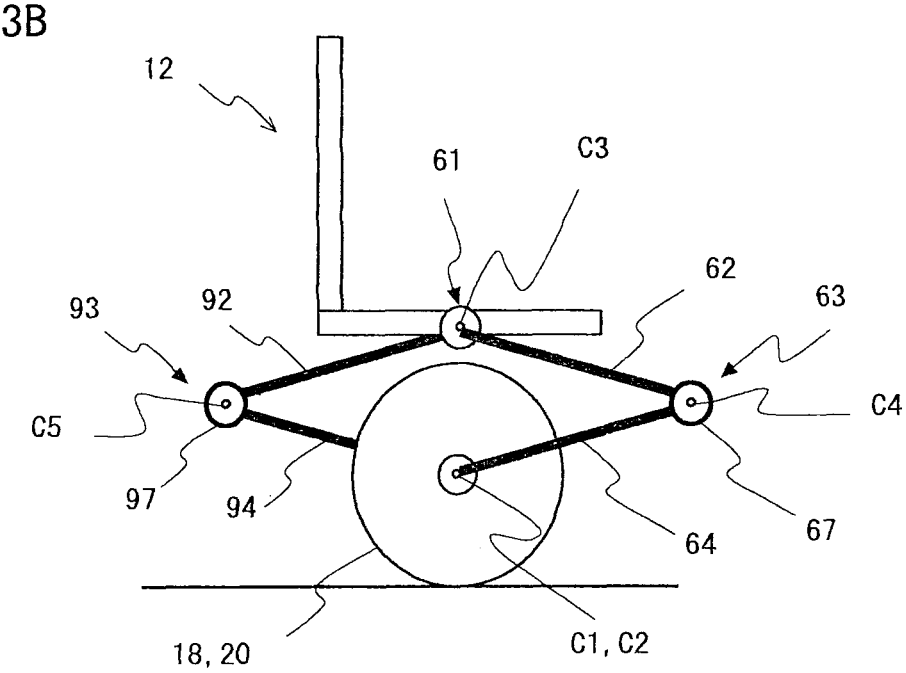
FIG. 3B A side view for describing the operation of the moving body when a fail occurs according to the embodiment of the present invention.

Furthermore, the vehicle height can be varied by driving both of the right arm 14 and the left arm 16. For example, the right arm 14 and the left arm 16 are bent into the dog leg shape from a state shown in FIG. 3A in which the right arm 14 and the left arm 16 are extended. Accordingly, as shown in FIG. 3B, the body 12 moves downwardly, which lowers the vehicle height. FIGS. 3A and 3B are side views describing the operation of the arms of the moving body 100. Here, each joint is rotated in a way that the height of the rotation axis C4 is equal to the height of the rotation axis C5. Accordingly, the rotation axis C4 and the rotation axis C5 are in the same horizontal plane. Thus, the position of the center of mass of the body 12 becomes lower while keeping the body 12 horizontal in the lateral direction. In other words, the position of the center of mass of the body 12 approaches the rotation axes C1 and C2. The vehicle height of the moving body 100 can thus be lowered. In summary, the highest part of the body 12 approaches the ground, and the seating surface is lowered. This reduces radius of rotation of the body 12, which decreases the moment. Thus, the impact upon occurrence of overturning can be mitigated by lowering the vehicle height upon occurrence of abnormality. More specifically, when a fail signal indicating that the moving body 100 is in the abnormal state is input to the control unit 80, the control unit 80 lowers the vehicle height. Thus, the impact upon occurrence of overturning in case of occurrence of abnormality can be reduced. As such, by driving both arms, the position of the center of mass of the body 12 moves in the vertical direction.

Furthermore, upon occurrence of abnormality, as shown in FIG. 3B, the lower joint 63 of the right arm 14 is projected forward in the travelling direction. Accordingly, the impact absorbing member 67 provided in the lower joint 63 is projected anteriorly to the body 12 in the travelling direction. Thus, the impact that occurs when the moving body 100 overturns in the forward direction can be absorbed. Further, the impact is absorbed by the impact absorbing member 67 even when the moving body hits the wall in the forward side of the travelling direction. As such, the lower joint 63 is projected, and accordingly, it is the lower joint 63 that firstly hits against the ground upon occurrence of the overturning in case of occurrence of abnormality. Then, the impact absorbing member 67 is provided at a place that contacts with the ground upon occurrence of overturning. Accordingly, the impact applied to the passenger upon occurrence of overturning is absorbed. Further, the impact when the moving body hits against the surrounding people can be absorbed. Accordingly, the improved safety can be achieved.

Here, the lower joint 93 of the left arm 16 is projected backward in the travelling direction. Accordingly, the impact absorbing member 97 provided in the lower joint 93 is projected posteriorly to the body 12 in the travelling direction. Accordingly, the impact that is generated when the moving body 100 overturns in the backward direction can be absorbed. For example, even when the moving body 100 hits against the wall in the front side with the state shown in FIG. 3B, the impact is absorbed as the impact absorbing member 67 is provided at the front of the body. Furthermore, the impact absorbing member 97 arranged in the left arm 16 hits against the ground or the wall even when the moving body 100 overturns in the backward side due to the force when it hits against the wall in the front side. Accordingly, the impact absorbing member 97 arranged at the back of the moving body 100 hits against the ground or the wall. The impact can thus be absorbed. Even when the moving body hits against the wall of the front-back direction, the impact absorbing members 67 and 97 absorb the impact. Accordingly, the safety level can further be enhanced by projecting the impact absorbing members 67 and 97 in both the forward and the backward directions.

Now, the right arm 14 and the left arm 16 are rotated by the same angle in opposite directions with each other. More specifically, when the operation moves from FIG. 3A to FIG. 3B, the lower joint 63 rotates in a counterclockwise direction, while the lower joint 93 in a clockwise direction. Further, the rotation angles of the lower joint 63 and the lower joint 93 are made the same. Furthermore, the upper joint 61 rotates in the clockwise direction, and the upper joint 91 in the counterclockwise direction. Then, the rotation angles of the upper joint 61 and the upper joint 91 are made the same. Accordingly, the configuration is obtained in which the right arm 14 and the left arm 16 are inverted to each other. In other words, when the moving body 100 is seen from the lateral direction with the state shown in FIG. 3B, the right arm 14 and the left arm 16 are inverted with respect to the vertical line that extends from the rotation axis C3 to the ground. Then, the rotation axis C3 is arranged on the axle that connects the rotation axis C1 and the rotation axis C2. Further, each joint is driven in synchronization with each other. Thus, it is possible to prevent the body 12 from being inclined in the lateral direction, which enhances the ride quality. The stability can thus be improved.

Furthermore, even when the arms are bent, as shown in FIG. 3B, the lower joints 63 and 93 are made higher than the axles C1 and C2. In summary, as the lower joints 63 and 93 are projected in the forward and the backward directions, the parts which firstly contact with the ground upon occurrence of the overturning can be made higher. Accordingly, the impact absorbing members 67 and 97 are projected in the front-back direction above the axles C1 and C2. Accordingly, the overturning can be prevented that may occur when the lower joints 63 and 93 of the arms 14 and 16 run on the ground. In summary, the lower joints 63 and 93 that firstly hit against the ground upon occurrence of overturning are arranged to be apart from the ground with a certain distance. This is due to the fact that the lower joints 63 and 93 are projected in the forward and backward of the body 12 by bending the arms. In other words, by optimizing the length of the both arms and the angle of the joints, the clearance of the impact absorbing members 67 and 97 against the ground can be maintained. Accordingly, overturning due to running-on can be prevented even when the impact absorbing members 67 and 97 are projected anteriorly and posteriorly to the body 12. Thus, the overturning can be prevented at the ground with a step or the like.

Figure 4:
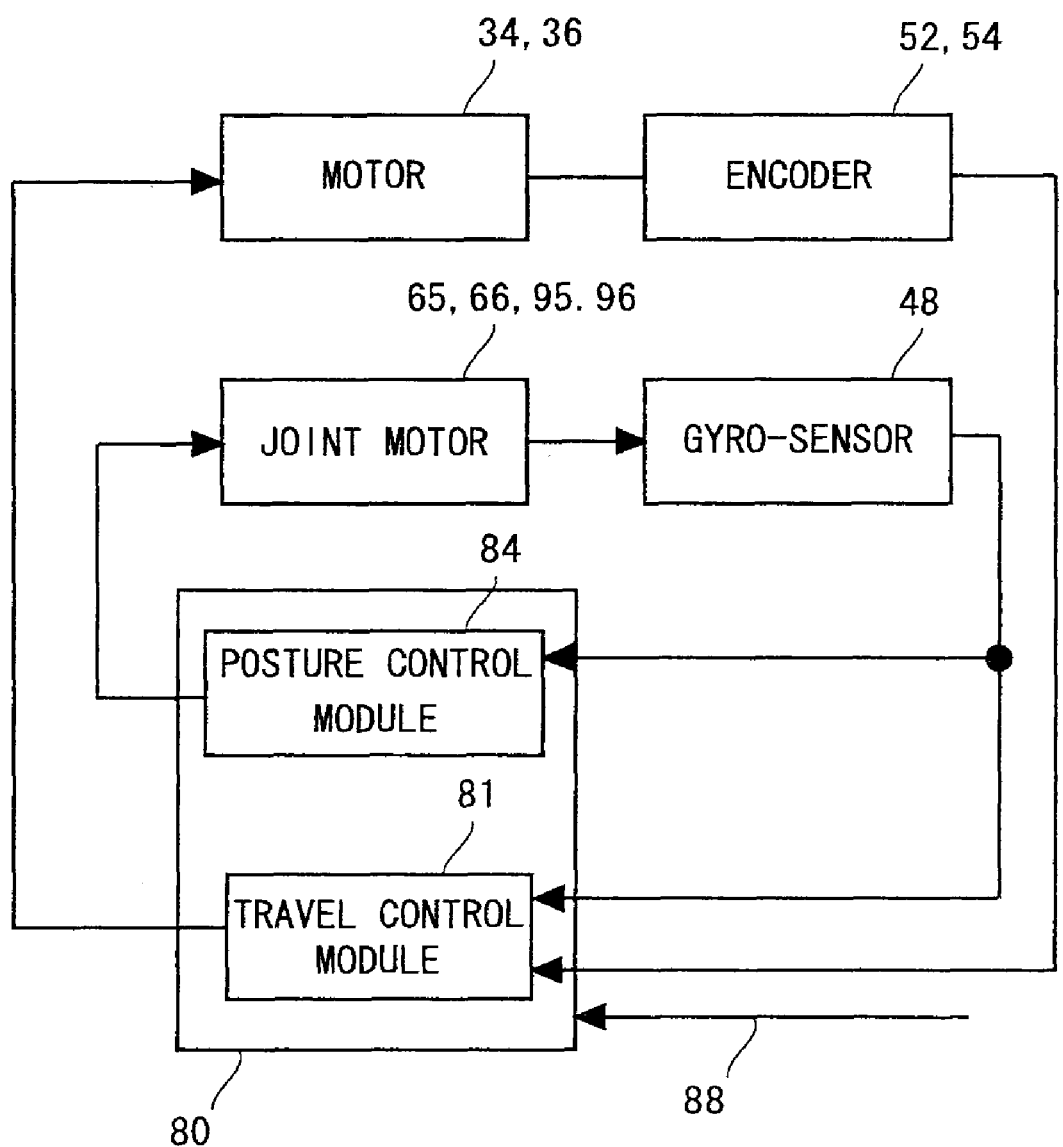
FIG. 4 A block diagram showing the structure of a control system of the moving body according to the embodiment of the present invention.

Now, the control by the control unit 80 will be described with reference to FIG. 4. FIG. 4 is a block diagram describing the control of the control unit 80. The control unit 80 includes a travel control module 81 and a posture control module 82. The control unit 80 controls the travel control module 81 and the posture control module 82 in an integrated manner. The travel control module 81 includes amplifiers controlling the right wheel drive motor 34 and the left wheel drive motor 36. The travel control module 81 outputs drive signals to the right wheel drive motor 34 and the left wheel drive motor 36, and performs feedback control of the right driving wheel 18 and the left driving wheel 20. More specifically, measured values obtained by the right wheel encoder 52 and the left wheel encoder 54 are input to the travel control module 81. Further, the inclination angle velocity obtained by the gyro-sensor 48 is input to the travel control module 81 so that the inverted state becomes stable. Furthermore, a command value corresponding to the manipulations carried out on the manipulation module 46 is input to the travel control module 81. Then, the travel control module 81 drives the right wheel drive motor 34 and the left wheel drive motor 36 based on the measured values, the inclination angle velocity, and the command value. In this manner, the travel control module 81 performs feedback control of the right driving wheel 18 and the left driving wheel 20. As a result, the moving body 100 moves in accordance with the manipulations carried out on the manipulation module 46. As a result, the moving body 100 travels stably in the inverted state. In this case, a well-known control method can be employed as the feedback control.

The posture control module 82 controls the posture of the moving body 100. That is, the posture control module 82 includes amplifiers that drive the motors of each joint of the right arm 14 and the left arm 16. The posture control module 82 outputs control signals to control the posture of the right arm 14 and the left arm 16. More specifically, a detection signal indicating the inclination angle velocity of the body 12 is input to the posture control module 82 from the gyro-sensor 48. In summary, the inclination angle velocity values of the body 12 detected in the gyro-sensor 48 are input to the posture control module 82. Then, it is detected by the inclination angle velocity detected at the gyro-sensor 48 that the body 12 is inclined in the lateral direction. When the body 12 is inclined in the lateral direction, the right arm 14 or the left arm 16 is driven. In this case, the body 12 drives the arm which is higher to correct the inclination angle. In short, the posture control module 82 controls one of the arms so as to cancel out the inclination angle. Thus, the variations of the inclination angle in the lateral direction decreases, which makes it possible to stably travel the vehicle. It is possible to improve the ride quality for the passenger.

Furthermore, the posture control module 82 controls the drive of the right arm 14 and the left arm 16 upon occurrence of abnormality. Thus, the vehicle height can be lowered. The fail signal 88 indicating that the abnormality occurs in the moving body 100 is input to the posture control module 82 from the electronic device in the moving body 100. The posture control module 82 lowers the vehicle height based on the fail signal 88. Thus, the right arm 14 and the left arm 16 are bent so that the rotation axis C3 is made closer to the rotation axes C1 and C2. An alarm signal that is output from a device when abnormality occurs in each device can be used as the fail signal 88. For example, the alarm signal which is output upon occurrence of abnormality in the right wheel drive motor 34 or the left wheel drive motor 36 may be used as the fail signal.

More specifically, the fail signal is output upon occurrence of current abnormality in the right wheel drive motor 34 or the left wheel drive motor 36, or communication abnormality between the control unit 80 and the motor. Alternatively, the alarm signal output from the right wheel encoder 52 or the left wheel encoder 54 upon occurrence of encoder abnormality may be used as the fail signal. Further alternatively, the fail signal may be the alarm signal output from each device such as the battery module 44, the gyro-sensor 48, and the sensor 58. As such, the alarm signal output from the device related to the travelling of the moving body 100 may be used as the fail signal. Accordingly, when the device is broken and this affects the travelling of the moving body 100, the fail signal 88 is output as it is recognized that the moving body 100 is in the abnormal state in which it cannot normally travels. Then, the arms are driven in accordance with the fail signal 88 output when the state is in the abnormal state. Thus, the vehicle height can be lowered without failure upon occurrence of abnormality.

As such, the fail signal 88 is output from a device (sensor, encoder, motor, battery, control unit or the like) mounted to the moving body 100, for example. For example, when there is a failure in the device, the alarm signal indicating the failure is output from the device. The alarm signal indicating the failure can be used as the fail signal. More specifically, the failure occurred in the device badly affects the travelling of the moving body 100. When there is a failure in the device, the state is in the abnormal state in which the moving body 100 cannot normally travels. Upon occurrence of abnormality such as failure in the device, the alarm signal is output from the device as the fail signal. Further, when the output from the device such as the encoder or various sensors is in the abnormal value, the fail signal is output from the device or from the control unit 80. For example, the fail signal is output when the torque output by the right wheel drive motor 34 or the left wheel drive motor 36 has abnormal value. The fail signal is output upon occurrence of the operation abnormality in each device. As such, a plurality of devices related to the travelling are provided in the moving body 100. Then, the moving body 100 travels by operating the plurality of devices. The abnormal state is recognized based on the fail signal output from one or more of the plurality of devices provided in the moving body 100. Then, the fail signal 88 is output, and the above operation is executed. More specifically, the vehicle height is lowered based on the fail signal output from the device arranged to control the rotation of the right driving wheel 18 and the left driving wheel 20. Thus, the vehicle height can be lowered without failure when the moving body 100 is in the abnormal state in which the normal operation cannot be performed. Note that the device that outputs the fail signal is not specifically limited.

Figure 5:
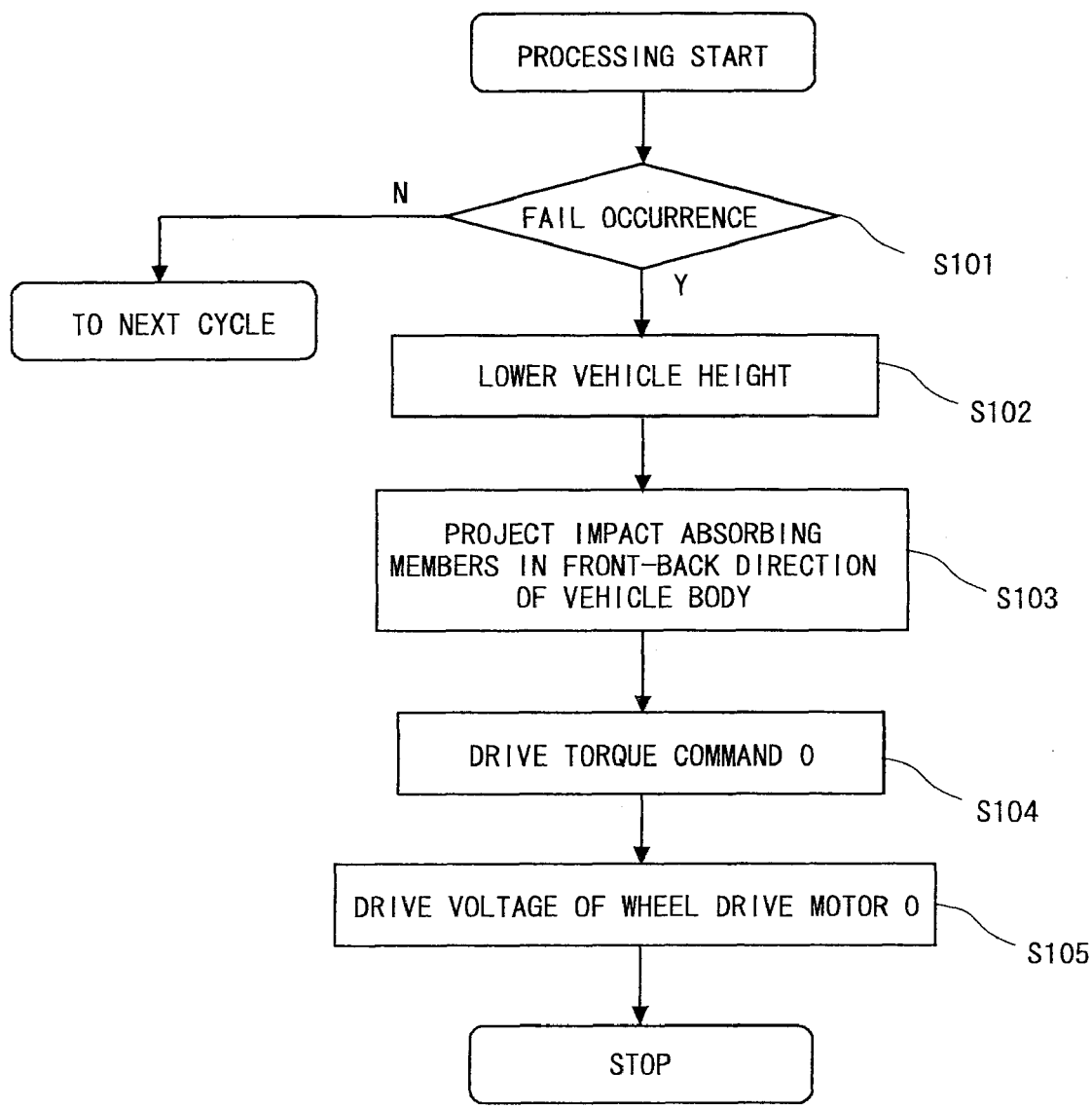
FIG. 5 A flowchart showing a control method for the moving body according to the embodiment of the present invention.

Now, the control of the vehicle height stated above will be described with reference to FIG. 5. FIG. 5 is a flow chart showing the control method as above. First, when the travelling processing of the moving body 100 is started, it is judged whether the fail occurs (step S101). In other words, it is judged whether the fail signal output from the electronic device in the abnormal state is input to the control unit 80. When the fail signal is input, it is judged that the fail occurs. When the fail signal is not input, it is judged that the fail does not occur. When the fail signal is not input, the next cycle is repeated. In summary, the moving body travels normally, and the operation goes back to step S101. On the other hand, when the fail occurs, the vehicle height is lowered (step S102). In other words, the joint motors of the right arm 14 and the left arm 16 are driven to make the rotation axis C3 close to the ground. Here, each joint motor is driven by a predetermined rotation angle. In short, the posture of the arms when the vehicle height is lowered is predetermined. Accordingly, the vehicle height can be lowered by a certain height when the fail occurs. Thus, a moment upon occurrence of the overturning is reduced, and the impact can be mitigated.

Then, the impact absorbing members 67 and 97 are projected in the front-back direction of the body 12 (step S103). In summary, the impact absorbing member 67 is projected in the forward side of the body 12, and the impact absorbing member 97 is projected in the backward side of the body 12. Accordingly, even when the moving body 100 overturns, one of the impact absorbing member 67 and the impact absorbing member 97 firstly hits against the ground. Thus, the impact can be absorbed.

After projecting the impact absorbing members 67 and 97, each command value of the drive torque with respect to each wheel drive motor is made 0 (step S104). In other words, when the body 12 is lowered to the predetermined height, each torque of the right wheel drive motor 34 and the left wheel drive motor 36 is made 0. Then, the drive voltage of the wheel drive motor is made 0 (step S105). Thus, the movement of the moving body 100 is stopped. According to such a control, the impact that is produced upon occurrence of abnormality can be reduced. Further, each joint of the arms lowers the vehicle height and projects the impact absorbing members 67 and 97. In summary, the driving operation to lower the vehicle height and the driving operation to project the impact absorbing members are executed by the common actuator. Accordingly, the impact can be reduced with the simple configuration, and the control can be simplified. Furthermore, as the vehicle height is made higher, a desired seating surface can be set to a desired height when the moving body travels normally. For example, the height of a face of the passenger can be made substantially equal to that of a face of a walking person. Accordingly, the passenger can move while talking with the walking person, which can improve the convenience.

Although each arm is described as being extended when the moving body travels normally without occurrence of the fail, both arms may be bent by the same angle when the moving body travels normally as well. Further, although the rotary joint is provided in each arm in the above description, it is not limited to such an example. For example, a direct-acting joint may be provided in the arms, and the body 12 may be slid along with the arms. In other words, the vehicle height may be made lower by retracting the arms upon occurrence of the fail.

Furthermore, although the impact absorbing members are projected by each joint of the arms to lower the vehicle height in the above description, the actuator to lower the vehicle height and the actuator to project the impact absorbing member may be separately provided. For example, the actuator that can be extended and retracted in the front-back direction may be separately provided, and the impact absorbing member may be provided at the end of the actuator.

Figure 6A:
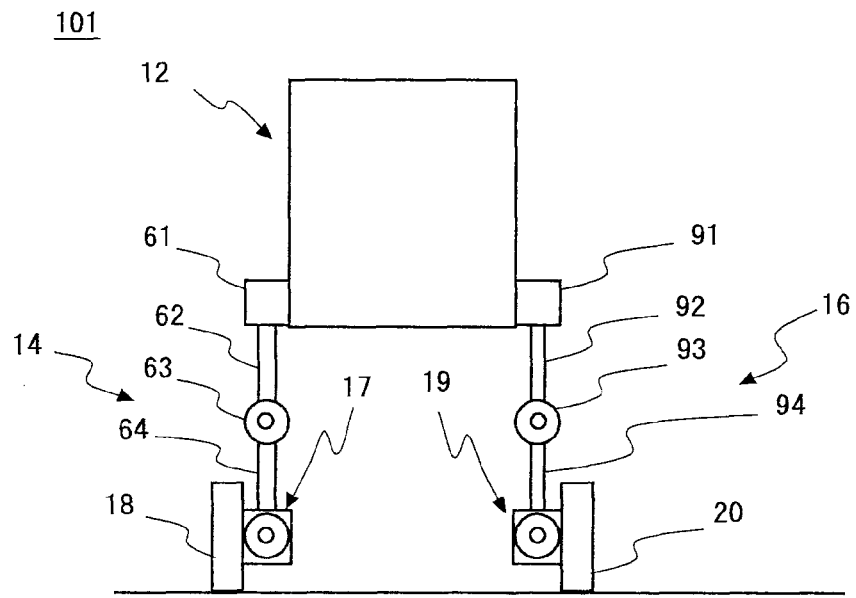
FIG. 6A A front view showing the structure of a moving body according to another embodiment of the present invention.
Figure 6B:
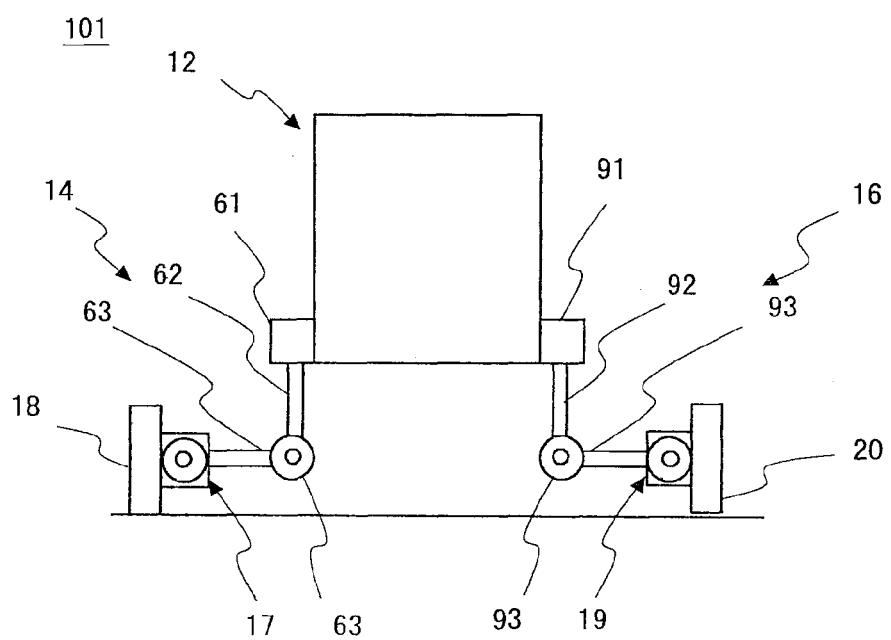
FIG. 6B A front view showing the structure of the moving body according to another embodiment of the present invention.

Next, the configuration of a moving body 101 according to another embodiment of the present invention will be described with reference to FIGS. 6A and 6B. FIGS. 6A and 6B are front views schematically showing the configuration of the moving body 101 according to another embodiment. FIG. 6A is a diagram showing a state when the moving body travels normally, and FIG. 6B shows a state when the fail occurs. As the basic configuration and the control of the moving body 101 are similar to those of the moving body 100, the description will be omitted.

As shown in FIG. 6A, in the moving body 101, the rotation axes of the lower joints 63 and 93 are different from those of the moving body 100. To be more specific, the rotation axes of the lower joints 63 and 93 are in a direction perpendicular to the paper in which FIGS. 6A and 6B are drawn. The lower joint 63 varies the angle of the lower link 64 with respect to the upper link 62. The lower joint 93 varies the angle of the lower link 94 with respect to the upper link 92. Accordingly, when the lower joints 63 and 93 are driven, the lower links 64 and 94 are rotated as shown in FIG. 6B. When the moving body travels normally, the vehicle height is made high as shown in FIG. 6A. When the fail occurs, the distance between the right chassis 17 and the left chassis 19 is made wider as shown in FIG. 6B. The vehicle height is thus lowered, which makes it possible to mitigate the impact. In this example, the lower joints 63 and 93 are rotated by 90°. Accordingly, the longitudinal direction of the lower links 64 and 94 corresponds to the lateral direction. As stated, the right arm 14 and the left arm 16 extend in the transverse direction when the fail occurs, which lowers the vehicle height.

Furthermore, in this embodiment, the joints are added to the right chassis 17 and the left chassis 19. The rotation axes of the joints of the both chassis are in a direction perpendicular to the paper. Upon occurrence of the fail, the joints of the right chassis 17 and the left chassis 19 are driven in synchronization with the lower joints 63 and 93. Accordingly, the outer peripheral surfaces of the right driving wheel 18 and the left driving wheel 20 are kept to be contacted with the ground. When the right driving wheel 18 and the left driving wheel 20 are sufficiently large, the end parts of the right driving wheel 18 and the left driving wheel 20 are projected in the forward and backward sides of the body 12. The right driving wheel 18 and the left driving wheel 20 are able to absorb the impact. As a matter of course, the impact absorbing members that project in the forward and backward sides of the body 12 and the actuators that drive the impact absorbing members may be separately provided.

Figure 7:
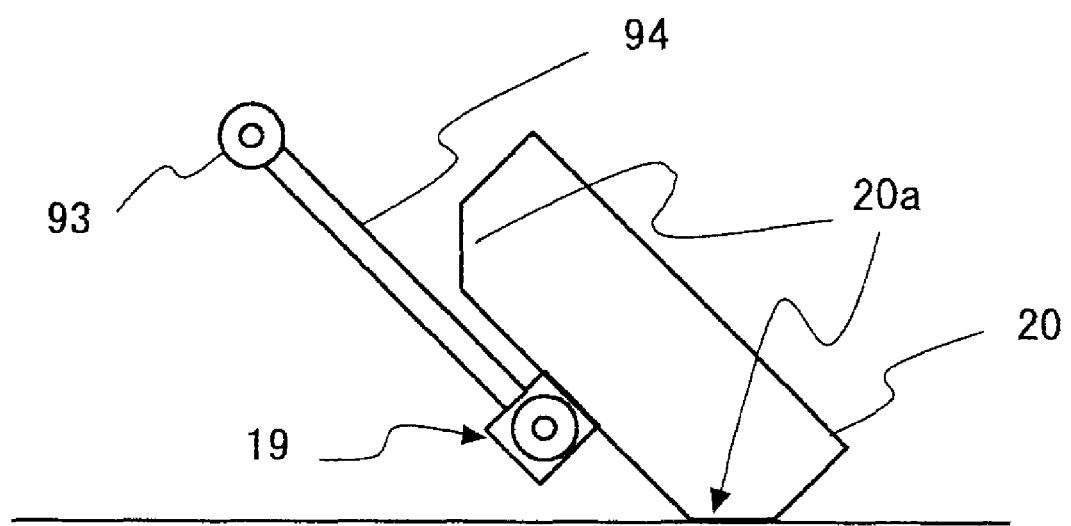
FIG. 7 A front view showing the structure of a vicinity of a left driving wheel of the moving body according to another embodiment of the present invention.

Furthermore, a preferred wheel shape for the moving body 101 of another embodiment will be described with reference to FIG. 7. FIG. 7 shows the configuration around the left driving wheel 20 while the vehicle height is being lowered. In summary, the fail signal rotates the lower joint 93, and the left arm 16 is extended.

As shown in FIG. 7, the outer peripheral surface of the left driving wheel 20 is chamfered. More specifically, the inner side ends of the outer peripheral surface of the left driving wheel 20 are tapered, and an inclined plane 20a is provided between the outer peripheral surface and the inner side surface. In the inclined plane 20a, the frictional coefficient is smaller. In other words, the inclined plane 20a has a smaller frictional coefficient compared with the outer peripheral surface of the left driving wheel 20. Accordingly, the friction when the left arm 16 is extended is lowered. In short, the friction that cancels the driving force of the lower joint 63 is decreased. By reducing the frictional coefficient of the inclined plane 20a, the left arm 16 can be easily extended in the transverse direction. Further, when the moving body travels normally, the inclined plane 20a does not contact with the ground, which does not affect driving of the wheels. As a matter of course, the similar wheel is employed as the right driving wheel 18 of the right arm.

Although the two-wheel type moving body 100 has been described in the above description, the number of wheels is not limited to such examples. The present invention is also applicable to single-wheel type moving bodies or to moving bodies having three or more wheels. Further, although the moving body 100 having the passenger seat 22 is explained in the above description, the moving body 100 may be a moving carriage for transporting objects. As a matter of course, the moving body 100 may be other similar moving bodies such as mobile robots.

Industrial Applicability

The present invention is widely applicable to an inverted wheel type moving body which moves by the rotation of wheels and the method of controlling the same.

The invention claimed is:

1. An inverted wheel moving body that includes a plurality of devices and moves by inverted pendulum control, the inverted wheel moving body comprising:
 a chassis rotatably supporting a wheel;
 a first drive unit rotationally driving the wheel;
 a body rotatably supported on the chassis through a support member;
 a second drive unit disposed in the support member and varying vehicle height of the inverted wheel moving body; and
 a control unit that controls the second drive unit to lower the vehicle height based on a fail signal output from one of a plurality of devices which has a failure when the inverted wheel moving body is in an abnormal state due to the failure of that device.

2. The inverted wheel moving body according to claim 1, comprising an impact absorbing member that projects in a travelling direction side according to the fail signal.

3. The inverted wheel moving body according to claim 2, comprising an impact absorbing member that projects in an opposite side of the travelling direction according to the fail signal.

4. The inverted wheel moving body according to claim 3, wherein
 a plurality of support members are provided,
 the impact absorbing member that projects in the travelling direction side is provided in a rotary joint arranged in a first support member of the plurality of support members,
 the impact absorbing member that projects in the opposite side of the travelling direction side is provided in a rotary joint arranged in a second support member of the plurality of support members, and
 the rotary joints of the first and the second support members are driven by the second drive unit.

5. The inverted wheel moving body according to claim 2, wherein the impact absorbing member is projected above a rotation axis of the wheel.

6. An inverted wheel moving body that includes a plurality of devices and moves by inverted pendulum control, the inverted wheel moving body comprising:
 a chassis rotatably supporting a wheel;
 a first drive unit rotationally driving the wheel;
 a body rotatably supported on the chassis through a support member;
 a second drive unit disposed in the support member and varying vehicle height of the inverted wheel moving body;
 a control unit that controls the second drive unit to lower the vehicle height based on a fail signal output from one of the plurality of devices when the inverted wheel moving body is in an abnormal state; and
 an impact absorbing member that projects in a travelling direction side according to the fail signal,
 wherein the impact absorbing member provided in a rotary joint is projected by the second drive unit driving the rotary joint provided in the support member.

7. A method of controlling an inverted wheel moving body, the inverted wheel type moving body comprising:
 a chassis rotatably supporting a wheel;
 a first drive unit rotationally driving the wheel;
 a body rotatably supported on the chassis through a support member; and
 a second drive unit disposed in the support member and varying vehicle height of the inverted wheel moving body, the inverted wheel moving body moving by operation of a plurality of devices, the method comprising:
 outputting a fail signal when the inverted wheel moving body is in an abnormal state;
 lowering the vehicle height by controlling the second drive unit to drive a rotary joint arranged in the support member according to the fail signal; and
 projecting an impact absorbing member arranged in the rotary joint in a travelling direction side by the second drive unit driving the rotary joint provided in the support member according to the fail signal.

8. A method of controlling an inverted wheel moving body, the inverted wheel moving body comprising:
 a chassis rotatably supporting a wheel;
 a first drive unit rotationally driving the wheel;
 a body rotatably supported on the chassis through a support member; and
 a second drive unit disposed in the support member and varying vehicle height of the inverted wheel moving body, the inverted wheel moving body moving by operation of a plurality of devices, the method comprising:
 outputting a fail signal from one of the plurality of devices which has a failure when the inverted wheel type moving body is in an abnormal state due to the failure of that device; and
 controlling the second drive unit to lower the vehicle height according to the fail signal.

9. The method of controlling the inverted wheel moving body according to claim 8, further comprising projecting an impact absorbing member in a travelling direction side according to the fail signal.

10. The method of controlling the inverted wheel moving body according to claim 9, wherein the impact absorbing member projects in the travelling direction and in an opposite side of the travelling direction in the projecting the impact absorbing member.

11. The method of controlling the inverted wheel moving body according to claim 10, wherein
 a plurality of support members are provided,
 the impact absorbing member that projects in the travelling direction side is provided in a rotary joint arranged in a first support member of the plurality of support members,
 the impact absorbing member that projects in the opposite side of the travelling direction side is provided in a rotary joint arranged in a second support member of the plurality of support members, and
 the rotary joints of the first and the second support members are driven by the second drive unit.

12. The method of controlling the inverted wheel moving body according to claim 8, wherein the impact absorbing member is projected above a rotation axis of the wheel.

* * * * *